(12) United States Patent
Gerrtis

(10) Patent No.: US 8,649,058 B2
(45) Date of Patent: Feb. 11, 2014

(54) METHOD TO ENHANCE DETAILED INFORMATION

(71) Applicant: OCE-Technologies B.V., Venlo (NL)

(72) Inventor: Carolus Gerrtis, Velden (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 13/724,441

(22) Filed: Dec. 21, 2012

(65) Prior Publication Data

US 2013/0114093 A1  May 9, 2013

Related U.S. Application Data

(63) Continuation of application No. PCT/EP2011/060292, filed on Jun. 21, 2011.

(30) Foreign Application Priority Data

Jun. 25, 2010 (EP) .................................... 10167384

(51) Int. Cl.
H04N 1/40 (2006.01)
(52) U.S. Cl.
USPC .......................................... 358/2.1; 358/3.27
(58) Field of Classification Search
USPC .......... 358/1.9, 2.1, 500, 504, 400, 406, 3.27, 358/3.03–3.09, 3.14, 3.21; 382/264, 382/273–275
See application file for complete search history.

(56) References Cited

U.S. PATENT DOCUMENTS

| 5,371,615 A | 12/1994 | Eschbach | |
|---|---|---|---|
| 6,504,947 B1 * | 1/2003 | Nozaki et al. | 382/148 |
| 7,167,597 B2 * | 1/2007 | Matsushima | 382/274 |
| 7,880,927 B2 * | 2/2011 | Usui et al. | 358/1.9 |
| 8,452,120 B2 * | 5/2013 | Aoyama | 382/266 |

FOREIGN PATENT DOCUMENTS

EP  1 475 745 A1  11/2004

* cited by examiner

*Primary Examiner* — Thomas D Lee
*Assistant Examiner* — Stephen M Brinich
(74) *Attorney, Agent, or Firm* — Birch, Stewart, Kolasch & Birch, LLP.

(57) ABSTRACT

A method for enhancing detail information in rasterized, continuous tone images includes a function that enlarges the contrast of a pixel in a neighborhood of pixels when in that neighborhood one of the pixels has a value that is close to a white color. This is determined by selecting the whitest pixel in the neighborhood. The function shows a gradual transition between the situations in which the whitest pixel is close to the white color and in which the whitest pixel is far from the white color. The method results in a better rendering of fine print when the image is sent to a printing system that reproduces the image on receiving material. For small characters, the legibility is improved by application of this method.

6 Claims, 5 Drawing Sheets

METHOD TO ENHANCE DETAILED INFORMATION

CROSS-REFERENCE TO RELATED APPLICATIONS

This application is a Continuation of International Application No. PCT/EP2011/060292, filed on Jun. 21, 2001, and for which priority is claimed under 35 U.S.C. §120, and which claims priority under 35 U.S.C. §119 to Application No. 10167384.6, filed on Jun. 25, 2010. The entirety of each of the above-identified applications is expressly incorporated herein by reference.

BACKGROUND OF THE INVENTION

1. Field of the Invention

The present invention relates to a method of transforming pixels of a first digital image into pixels of a second digital image, each pixel having a value that indicates a color of the pixel. The method includes the steps of defining a neighborhood of pixels for a pixel of the first digital image, determining a new value for the pixel based on the values of the pixels in the neighborhood, and placing the new value of the pixel in the second digital image. The present invention further relates to an electronic component, a computer program product embodied on at least one non-transitory computer-readable storage medium, and a printing system.

2. Background of the Invention

Digital images are a well-known representation of images. The image is divided in pixels, each pixel being associated with a position in the image, and each pixel being specified by a value of a finite set of quantized values. The set of quantized values refers to colors in a specific color space, usually having more than one dimension. Examples of color spaces are the RGB- and CMYK-color spaces, but also the XYZ-, Lab-, YCbCr-, and HSL-color spaces. A value of a color is formed by the components of a vector in these spaces. In each of these color spaces, a white color is defined. For printing purposes, this white color is often equivalent to the medium color on which the impression is made and therefore corresponds to the no ink color. This color is characterized by zero coverage for all process inks in the appropriate color space. Each color space has its own way of expressing distances between the various colors, either as a Euclidian distance between the points indicated by the vector components or as a multivariable function of the components of the two colors. The color difference between two neighboring pixels is also referred to as the contrast between two pixels.

Digital images stem from a variety of sources, including computer applications, scanners, digital cameras and other kinds of electronic image generators. In these sources, the number of pixels is sufficiently large to contain fine information, This is provided by pixels with a color that is clearly distinguishable from the colors of the pixels around them, when the pixels are rendered on a display or in a printed form. The information is conveyed by the contrast between a pixel belonging to the fine information and the pixels in its neighborhood, which includes pixels that are not more than a few pixel distances away. However, because of limitations of the physical processes at the time of generating the digital image, such as light scattering, or the limitations of the way the digital image is saved electronically, dependent on, e.g. the compression that is used, the contrast between a pixel and the pixels in the neighborhood may be less than necessary for good conveyance of the intended information. Several methods exist, such as discrete laplacian filtering and unsharp masking, that improve the legibility of fine information. Disadvantages of these methods include the enhancement of noise and the possibility of overshoot artifacts. This is especially inconvenient when the information is surrounded by a colored background.

A problem of the present state of the art is the occurrence of the artifacts around fine information when the legibility of fine information is increased. The goal of the present invention is to increase the legibility of the fine information in a digital image without causing artifacts.

SUMMARY OF THE INVENTION

According to the present invention, the goal is obtained by a method wherein the step of determining a new value for the pixel comprises the further steps of determining a value of a whitest pixel in the neighborhood that indicates a color of a pixel in the neighborhood that is most close to a white color, determining a contrast between the pixel and the whitest pixel in the neighborhood, and calculating a new value for the pixel, enlarging the contrast between the pixel and the whitest pixel in the neighborhood, based on the value of the pixel in the first digital image, based on a distance between the color of the whitest pixel in the neighborhood and the white color and based on the contrast between the pixel and the whitest pixel. The new value of the pixel is changed in the direction that the contrast between the pixel and the whitest pixel is increased to improve the legibility. This works remarkably well and no interference with other characteristics of the pixels around the fine information, which could be the source of artifacts, are observed.

In a further embodiment, the contrast between the new value of the pixel and the whitest pixel in the neighborhood, unless the contrast between the pixel and the whitest pixel in the neighborhood is smaller than a threshold value. This reduces the possibility of an unwanted contrast enhancement at the edges of low contrast information that is intended to be low contrast.

In a further embodiment, a gradual transition takes place from a situation in which the whitest pixel in the neighborhood is close to the white color and the contrast between the new pixel and the whitest pixel in the neighborhood is larger than the contrast between the pixel and the whitest pixel in the neighborhood to a situation in which the whitest pixel in the neighborhood is far from the white color and the contrast between the new pixel and the whitest pixel in the neighborhood is hardly larger than the contrast between the pixel and the whitest pixel in the neighborhood. This further reduces artifacts that occur due to noise in the values of pixels in the neighborhood of the pixel that is given a new value.

The present invention is also embodied in a electronic component configures as an application specific programming unit to apply one of the methods of the present invention. This embodiment has the advantage of a fast execution of the methods.

The present invention is further embodied in a printing system, including a CPU for controlling the behavior of the system and a printing process for marking receiving material, wherein of one of the methods of the present invention is used, giving the advantage of superior print quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
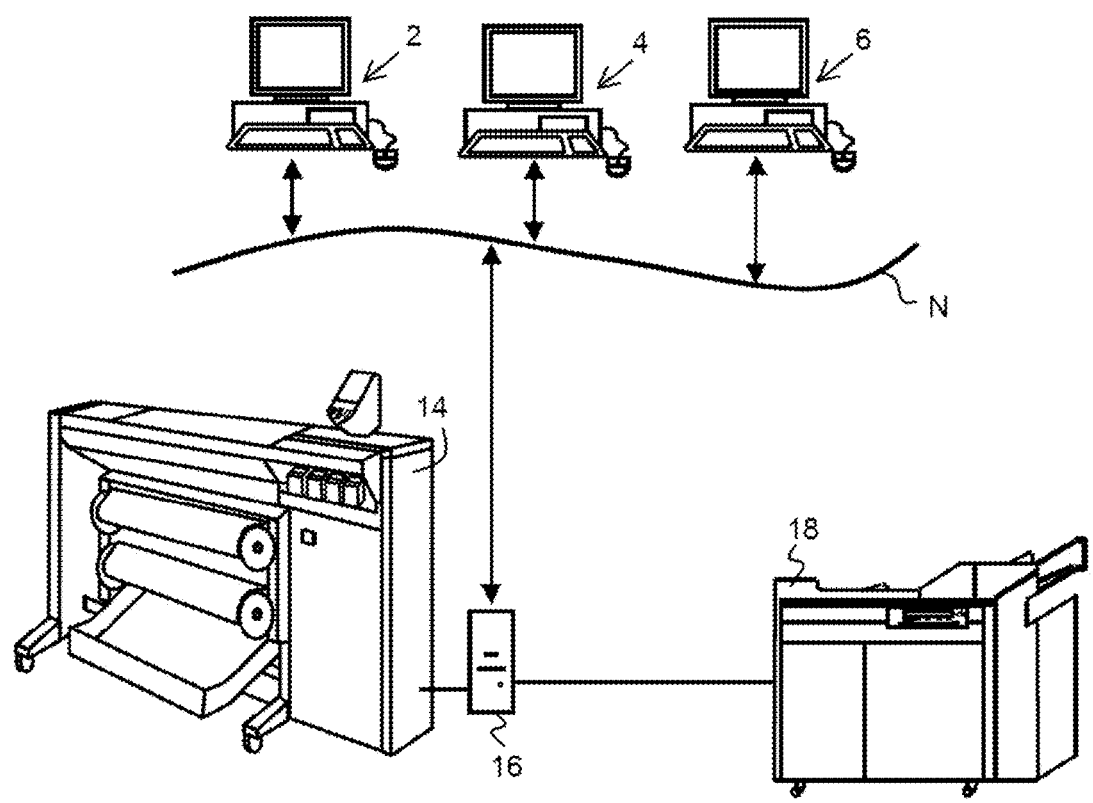
FIG. 1 is a printing system in which the method of the present invention is used.

The present invention will now be described with reference to the accompanying drawings, wherein the same or similar elements are identified with the same reference numeral.

The printing system in FIG. 1 comprises a number of workstations (2, 4, 6) that are connected to a printer controller 16 through a network N. On the workstations, print jobs are prepared involving documents in various formats and various sizes. The image data in these documents originate from different sources, such as scanners, digital cameras and computer applications. The print jobs are sent to the printer controller where the jobs are analyzed and the documents converted into signals that are appropriate to be accepted by one of the printers connected to the controller. In this case, a printer 14 for large size documents, such as CAD drawings and banners, and a printer 18 for office size documents are available. In the process of converting, the documents are rasterized and rendered employing the process colors of the printer to be used. In this process, also a number of methods are applied that improve the appearance of the image on the receiving material that is used in the printer. One of these methods is the method that is the subject of the present invention that improves the legibility of the documents.

Figure 2:
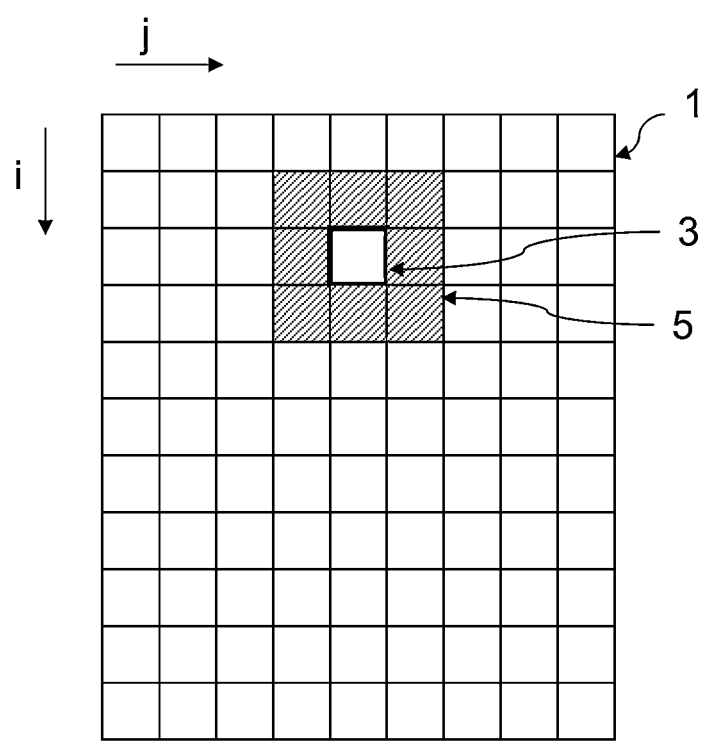
FIG. 2 is a schematic drawing of a neighborhood of pixels for a pixel for which a new value is determined.

In FIG. 2, an image 1 to be printed is shown in its rasterized form indicating a pixel 3 that is under consideration in its neighborhood 5 that is indicated by the shaded area. Also indicated are the indices i and j that are used to mark the position in the image with which a pixel is associated.

Figure 3:
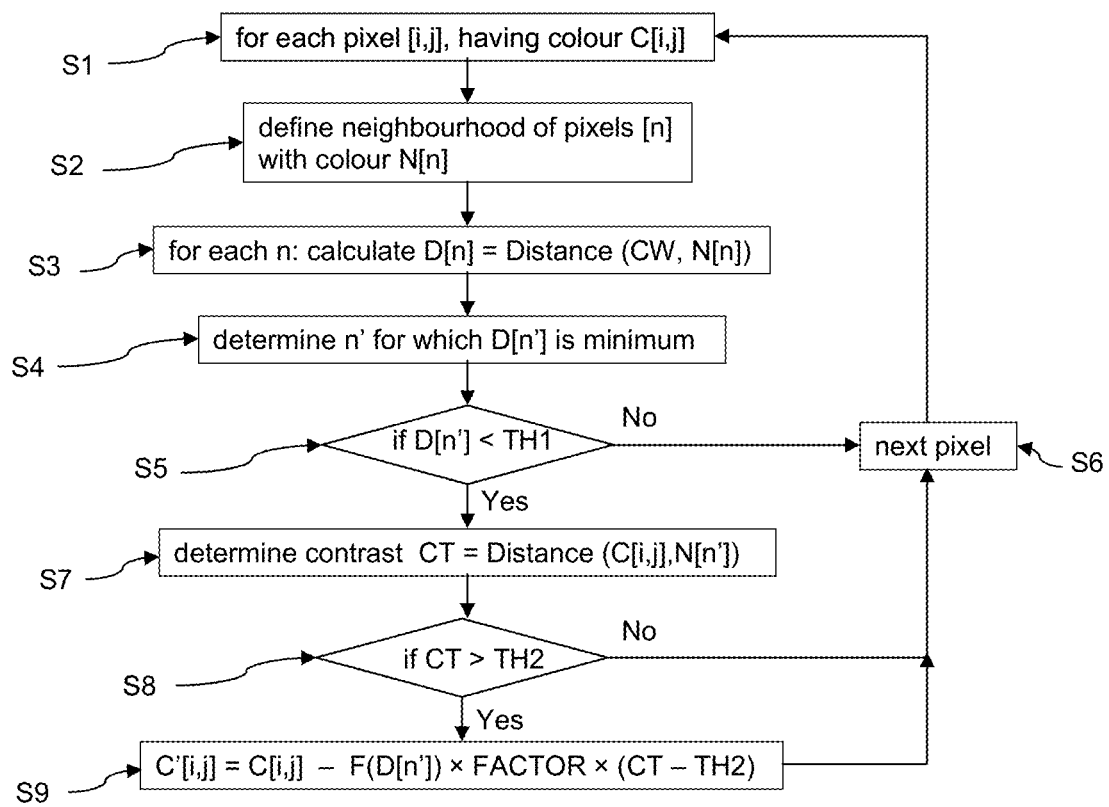
FIG. 3 is a flow diagram for an embodiment of the image processing method.

FIG. 3 shows a flowchart of the various steps in the method for improving legibility. Each pixel is subjected to a process in which a decision is taken whether to pass the color of the pixel unchanged or to adjust the color. The color is designated by C[i,j] that in this embodiments takes the form of the channels R[i,j], G[i,j], B[i,j] for the red, green and blue component of the color for the pixels in the image. All three channels may be adjusted, but in this embodiment only the G-channel is. For the designation of the color of the pixel, other color components may also be used.

After selecting a pixel in step S1, which is, e.g. pixel 3 in FIG. 2, a neighborhood of pixels, numbered by n is defined in step S2, each pixel of the neighborhood having its own color N[n]. For each pixel in this neighborhood, the distance to the color white, represented by CW, is calculated in step S3. CW is in RGB coordinates equivalent to (255,255,255) when 8-bit values for R, G, and B are used. In Lab coordinates, CW is given by (100,0,0), and in CMYK coordinates CW is (0,0,0, 0). The distance is calculated as the Euclidean distance between the coordinates of the two colors. In step S4, the minimum of the distances between CW and the color of each of the pixels in the neighborhood is determined and the pixel n' for which this minimum is attained. This pixel has a color that is most close to the color white and consequently it is the whitest pixel in the neighborhood. In step S5, a comparison between the minimum distance and a first threshold, TH1, is made. If the minimum distance is larger (branch No), which means the whitest pixel is far removed from the color white, a next pixel is selected in step S6 and no adjustment takes place. If the minimum distance is the smaller (branch Yes), the whitest pixel is sufficiently close to the color white to start the determination of the contrast CT in steps S7. The value of TH1 is typically 25 for RGB-signals, but other values in the range of 10 to 120 may also be used.

In this embodiment, the contrast is calculated by the distance between the color of the referred pixel and the color of the whitest pixel in the neighborhood. In the same way as in step S3, the distance between two colors may be calculated in various ways in step S8, but in this embodiment, the Euclidean distance between the color coordinates is used. If the contrast is not larger than a second threshold, TH2, (branch No), a next pixel is selected in step S6 and no adjustment takes place. If the contrast is larger than the threshold TH2 (branch Yes), a new value for the color of the pixel is calculated in step S9. Thereafter, a next pixel is referred to until all pixels in the image have been referred to.

The calculation of the adjusted value of the color of the pixel C'[i,j] in step S9 starts with the original value C[i,j] from which a term of three factors is subtracted (in the case of RGB-colors). A first factor, depending on D[n'], the distance between the whitest pixel in the neighborhood and the color white is F(D[n']), which is transient factor that is close to 1 when the distance D[n'] is close to 0. The transient factor F(D[n']) is close to 0 when the distance D[n'] is large. This makes a gradual transition possible between the various values that the whitest pixel can have. A second factor, FACTOR, is a fixed value that is used to increase the contrast. This factor typically has a value of 5, but can be in the range from 2 to 10. The third factor is the difference between the contrast, CT, and the threshold, TH2. As is customary in this kind of image processing, the value of the colors that is outside of the available range is cut off at the lower or upper limit of the range.

Figure 4:
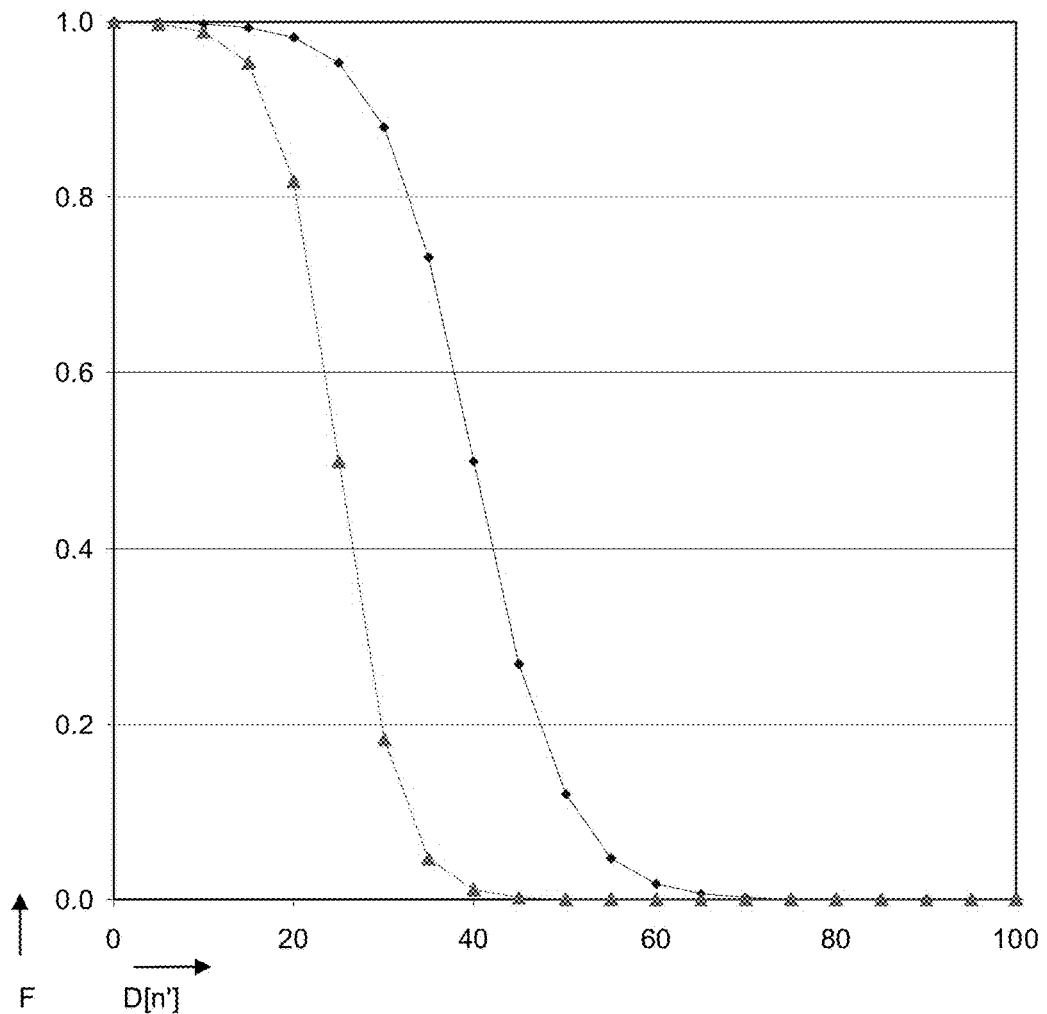
FIG. 4 is a graphical representation of two transient factor functions.

In FIG. 4 two possible transient factor curves are shown as a function of the distance D[n']. These are generated by the relation:

$$F(D[n'])=1/\{\exp[f*(D[n']-T)]+1\}$$

In a first curve, f=0.3 and T=25, giving a steep transient factor curve which has the value 0.5 when D[n']=25. A second curves has f=0.2 and T=40, giving a somewhat less steep curve which has the value 0.5 at D[n']=40. The use of these curves diminishes the effect of a varying value of the whitest pixel in the neighborhood.

Figure 5:
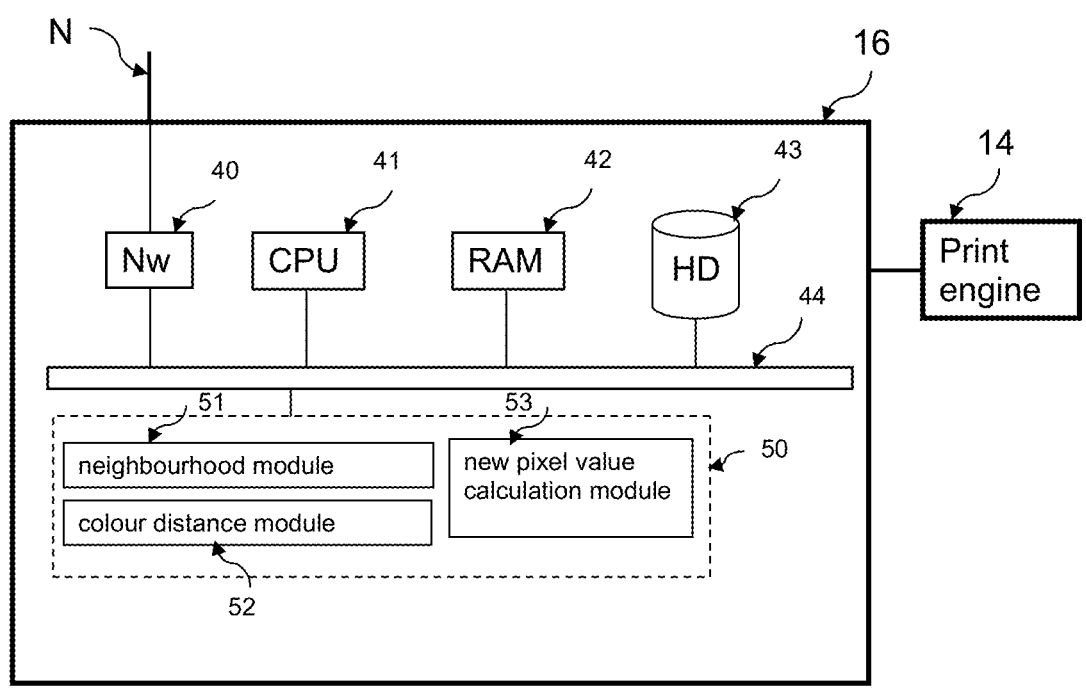
FIG. 5 is a printer controller adapted for performing the image processing method.

FIG. 5 shows how the method can be incorporated as a special module 50 in a printer controller 16 that is connected to a network N by a network module 40, which communicates with other modules in the printer controller through the central bus 44. Further, a Central Processing Unit 41, random access memory 42 and non-volatile memory 43 are provided. The special module 50 is equipped with a neighborhood module 51 that determines the neighborhood pixels of a pixel that is the input. The color of the neighborhood pixels is communicated to the color distance module 52, that determines the whitest pixel in the neighborhood. The color of this pixel is sent to the new value calculation module 53 that determines the new value of the pixel referred to according to the method as described in FIG. 3.

Many different embodiments, including a Field Programmable Gate Array to execute the described method in a limited number of clock cycles and a computer program that executes the various steps on general purpose electronic hardware, can be made. These are representations of the invention as described by the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of transforming pixels of a first digital image into pixels of a second digital image, each pixel having a value that indicates a color of the pixel, the method comprising the steps of:
   performing the following steps by a processor;
   defining a neighborhood of pixels for a pixel of the first digital image;
   determining a new value for the pixel based on the values of the pixels in the neighborhood; and
   placing the new value of the pixel in the second digital image,
   wherein the step of determining a new value comprises the further steps of:
      determining a value of a whitest pixel in the neighborhood that indicates a color of a pixel in the neighborhood that is most close to a white color;
      determining a contrast between the pixel and the whitest pixel in the neighborhood; and
      calculating a new value for the pixel, enlarging the contrast between the pixel and the whitest pixel in the neighborhood, based on the value of the pixel in the first digital image, based on a distance between the color of the whitest pixel in the neighborhood and the white color and based on the contrast between the pixel and the whitest pixel in the neighborhood.

2. The method according to claim 1, wherein the contrast between the new value of the pixel and the whitest pixel in the neighborhood is larger than the contrast between the pixel and the whitest pixel in the neighborhood, unless the contrast between the pixel and the whitest pixel in the neighborhood is smaller than a threshold value.

3. The method according to claim 2, wherein a gradual transition takes place from a situation in which the whitest pixel in the neighborhood is close to the white color and the contrast between the new pixel and the whitest pixel in the neighborhood is larger than the contrast between the pixel and the whitest pixel in the neighborhood, to a situation in which the whitest pixel in the neighborhood is far from the white color and the contrast between the new pixel and the whitest pixel in the neighborhood is hardly larger than the contrast between the pixel and the whitest pixel in the neighborhood.

4. A computer program product embodied on at least one non-transitory computer-readable storage medium comprising instructions for the execution of the method according to claim 1.

5. An electronic component configured as an application specific programming unit, wherein said application specific programming unit is configured to transform pixels of a first digital image into pixels of a second digital image, each pixel having a value that indicates a color of the pixel, and
   wherein said application specific programming unit is further configured to define a neighborhood of pixels for a pixel of the first digital image, determine a value of a whitest pixel in the neighborhood that indicates a color of a pixel in the neighborhood that is most close to a white color, determine a contrast between the pixel and the whitest pixel in the neighborhood, calculate a new value for the pixel, enlarging the contrast between the pixel and the whitest pixel in the neighborhood, based on the value of the pixel in the first digital image, based on a distance between the color of the whitest pixel in the neighborhood and the white color and based on the contrast between the pixel and the whitest pixel in the neighborhood, and place the new value of the pixel in the second digital image.

6. A printing system comprising a CPU for controlling the behavior of the system and controlling a printing process for marking receiving material, wherein the printing system is configured to transform pixels of a first digital image into pixels of a second digital image, the printing system comprising:
   a printer controller, comprising:
      a neighborhood module configured to define a neighborhood of pixels for a pixel of the first digital image;
      a color distance module configured to determine a value of a whitest pixel in the neighborhood that indicates a color of a pixel in the neighborhood that is most close to a white color and determine a contrast between the pixel and the whitest pixel in the neighborhood; and
      a new value calculation module configured to calculate a new value for the pixel, enlarging the contrast between the pixel and the whitest pixel in the neighborhood, based on the value of the pixel in the first digital image, based on a distance between the color of the whitest pixel in the neighborhood and the white color and based on the contrast between the pixel and the whitest pixel in the neighborhood,
   wherein the printer controller is further configured to place the new value of the pixel in the second digital image.

* * * * *

UNITED STATES PATENT AND TRADEMARK OFFICE
CERTIFICATE OF CORRECTION

| | |
|---|---|
| PATENT NO. | : 8,649,058 B2 |
| APPLICATION NO. | : 13/724441 |
| DATED | : February 11, 2014 |
| INVENTOR(S) | : Carolus Gerrits |

It is certified that error appears in the above-identified patent and that said Letters Patent is hereby corrected as shown below:

ON THE TITLE PAGE:

At item (72), Inventor, change "Carolus Gerrtis, Velden (NL)" to --Carolus Gerrits, Velden (NL)--.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,649,058 B2 | Page 1 of 1 |
| APPLICATION NO. | : 13/724441 | |
| DATED | : February 11, 2014 | |
| INVENTOR(S) | : Gerrtis | |

It is certified that error appears in the above-identified patent and that said Letters Patent is hereby corrected as shown below:

Title Page,

Item (75), Inventor, "Gerrits" (as corrected to read in the Certificate of Correction issued October 21, 2014) is deleted and patent is returned to its original state with inventor last name in patent to read -- Gerrtis --.

Signed and Sealed this
Twentieth Day of January, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,649,058 B2  
APPLICATION NO. : 13/724441  
DATED : February 11, 2014  
INVENTOR(S) : Gerrtis Page 1 of 1

It is certified that error appears in the above-identified patent and that said Letters Patent is hereby corrected as shown below:

This certificate supersedes the Certificate of Correction issued October 21, 2014. The certificate is vacated since petition under 1.182 was not filed with the office for consideration of request to correct inventor name. The Certificate of Correction was published in error and should not have been issued for this patent. The inventor name is reinstated as set forth in printed patent:

-- Carolus Gerrtis, Velden (NL) --.

Signed and Sealed this  
Fifth Day of January, 2016

Michelle K. Lee  
*Director of the United States Patent and Trademark Office*

UNITED STATES PATENT AND TRADEMARK OFFICE
CERTIFICATE OF CORRECTION

PATENT NO. : 8,649,058 B2
APPLICATION NO. : 13/724441
DATED : February 11, 2014
INVENTOR(S) : Carolus Gerrits It is certified that error appears in the above-identified patent and that said Letters Patent is hereby corrected as shown below:

ON THE TITLE PAGE:

At item (72), Inventor, change "Carolus Gerrtis, Velden (NL)" to --Carolus Gerrits, Velden (NL)--.

Signed and Sealed this
Sixteenth Day of August, 2016

Michelle K. Lee
*Director of the United States Patent and Trademark Office*